(12) United States Patent
Singleton, IV

(10) Patent No.: US 11,165,575 B2
(45) Date of Patent: Nov. 2, 2021

(54) TRACKING TAINTED CONNECTION AGENTS

(71) Applicant: Citrix Systems, Inc., Fort Lauderdale, FL (US)

(72) Inventor: Leo C. Singleton, IV, Fort Lauderdale, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 332 days.

(21) Appl. No.: 16/238,202

(22) Filed: Jan. 2, 2019

(65) Prior Publication Data

US 2020/0213112 A1 Jul. 2, 2020

(51) Int. Cl.
*H04L 9/30* (2006.01)
*H04L 9/08* (2006.01)

(52) U.S. Cl.
CPC .............. *H04L 9/30* (2013.01); *H04L 9/0894* (2013.01)

(58) Field of Classification Search
CPC ................................ H04L 9/30; H04L 9/0894
USPC ........................................................ 713/171
See application file for complete search history.

(56) References Cited

U.S. PATENT DOCUMENTS

| 6,002,768 | A * | 12/1999 | Albanese | H04N 7/15 348/E7.071 |
| 2003/0076962 | A1 * | 4/2003 | Roh | H04L 63/0823 380/282 |
| 2005/0055552 | A1 * | 3/2005 | Shigeeda | H04L 63/0823 713/171 |
| 2010/0070771 | A1 * | 3/2010 | Chen | H04L 9/3263 713/176 |
| 2010/0082991 | A1 | 4/2010 | Baldwin et al. | |
| 2012/0137117 | A1 | 5/2012 | Bosch et al. | |
| 2012/0328101 | A1 * | 12/2012 | Lakshminarayanan | H04L 63/0823 380/258 |
| 2013/0308778 | A1 * | 11/2013 | Fosmark | H04L 63/0823 380/270 |
| 2013/0311768 | A1 * | 11/2013 | Fosmark | G06Q 20/3823 713/155 |
| 2018/0060572 | A1 | 3/2018 | Singleton et al. | |
| 2018/0198620 | A1 | 7/2018 | Pearson | |
| 2018/0302226 | A1 * | 10/2018 | Heimlicher | H04L 63/18 |

OTHER PUBLICATIONS

Apr. 24, 2020—International Search Report—Intl App PCT/US20/12055.

(Continued)

*Primary Examiner* — Peter C Shaw
(74) *Attorney, Agent, or Firm* — Banner & Witcoff, Ltd.

(57) ABSTRACT

Methods and systems for tracking tainted connection agents, such as without a trusted central authority, are described herein. During a server outage, a client device may verify that a connection agent is untainted based on a public-key encryption or certificate-based system. If the connection agent is untainted, a server may sign a public key or certificate associated with the connection agent. The server may provide, to the client device, a lease, a public key associated with the server. The connection agent may sign data generated by the client device. The client device may verify a signature of the signed public key, such as based on the public key associated with the server. The client device may verify a signature of the signed data, such as based on the verified public key associated with the connection agent.

12 Claims, 11 Drawing Sheets

(56) References Cited

OTHER PUBLICATIONS

"Virtual machine," https://en.wikipedia.org/w/index.php?title=Virtual_machine&oldid=877338460, website visited Jan. 8, 2019.

"Public-key cryptography," https://en.wikipedia.org/w/index.php?title=Public-key_cryptography&oldid=876426468, website visited Jan. 8, 2019.

Margaret Rouse, "What is asymmetric cryptography (public key cryptography)?—Definition from WhatIs.com," https://searchsecurity.techtarget.com/definition/asymmetric-cryptography, website visited Jan. 8, 2019.

"SQL," https://en.wikipedia.org/w/index.php?title=SQL&oldid=873124770, website visited Jan. 8, 2019.

"Delivery Controllers," https://docs.citrix.com/en-us/xenapp-and-xendesktop/7-15-ltsr/manage-deployment/delivery-controllers.html, website visited Jan. 8, 2019.

"What is Citrix VDA in detail?," https://www.quora.com/What-is-Citrix-VDA-in-detail, website visited Jan. 8, 2019.

"Desktop virtualization," https://en.wikipedia.org/w/index.php?title=Desktop_virtualization&oldid=870248625, website visited Jan. 8, 2019.

"Hypervisor," https://en.wikipedia.org/wiki/Hypervisor, website visited Jan. 8, 2019.

Margaret Rouse, "What is virtual desktop infrastructure (VDI)?—Definition from WhatIs.com," https://searchvirtualdesktop.techtarget.com/definition/virtual-desktop-infrastructure-VDI, website visited Jan. 8, 2019.

"Digital signature," https://en.wikipedia.org/w/index.php?title=Digital_signature&oldid=876680165, website visited Jan. 8, 2019.

\* cited by examiner

TRACKING TAINTED CONNECTION AGENTS

FIELD

Aspects described herein generally relate to desktop and application virtualization, server-based computing environments, virtual machines, cloud computing, and networking.

BACKGROUND

Desktop and application virtualization technology may allow access to desktops and applications, such as independently of machines on which they are actually on, from any device with any operating system. Individuals of an enterprise may work and collaborate remotely regardless of device or network. Users may receive a dedicated virtual machine that is assigned for the lifetime of their session. Before users are assigned to a virtual machine, a trusted brokering authority may check whether the machine is clean or tainted, for example by previously logged in users. With an outage of the brokering authority, users may not be able to confirm that the machine is clean or tainted.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein relate to a method of registering, to one or more servers, a connection agent on a computing device and a public key associated with the connection agent. Based on a determination that the connection agent is not tainted by one or more previously logged in users, the one or more servers may sign the public key associated with the connection agent. The connection agent may receive, from the one or more servers, the signed public key associated with the connection agent. The connection agent may store the signed public key associated with the connection agent. The connection agent may sign data received from a client device. The connection agent may send, to the client device, the signed public key associated with the connection agent and the signed data. The determination that the connection agent is not tainted by one or more previously logged in users may include a determination that an unauthorized software application is not installed at the connection agent. Before the registering the connection agent and the public key associated with the connection agent, based on a determination that the connection agent is tainted, the one or more servers may reimage the connection agent. The one or more servers may generate a public key and a private key that are associated with the one or more servers. The one or more servers may store, in a database associated with the one or more servers, the public key and the private key that are associated with the one or more servers. The connection agent may remove, from the connection agent, a private key associated with the connection agent after the signing the data received from the client device. The connection agent may remove, from the connection agent, the signed public key associated with the connection agent and the public key associated with the connection agent after the sending the signed public key associated with the connection agent. After the sending the signed public key associated with the connection agent and the signed data, connecting the client device to one or more of a virtual desktop or virtual application associated with the connection agent.

One or more aspects of the disclosure may also provide a method of receiving, by a client device and from one or more servers, a public key associated with the one or more servers. The client device may receive, from a connection agent on a computing device, information comprising a public key associated with the connection agent and signed by a private key associated with the one or more servers and data generated by the client device and signed by a private key associated with the connection agent. The client device may determine whether a signature of the signed public key associated with the connection agent corresponds with the public key associated with the one or more servers. The receiving the public key associated with the one or more servers includes issuing, by the one or more servers to the client device, a connection lease. Based on a determination that the signature of the signed public key associated with the connection agent does not correspond with the public key associated with the one or more servers, the client device may connect to a second connection agent in the connection lease. Based on a determination that the signature of the signed public key associated with the connection agent corresponds with the public key associated with the one or more servers, the client device may determine whether a signature of the signed data corresponds with the signed public key associated with the connection agent. Based on a determination that the signature of the signed data does not correspond with the signed public key associated with the connection agent, the client device may connect to a second connection agent in the connection lease. Based on a determination that the signature of the signed data corresponds with the signed public key associated with the connection agent, the client device may connect to the connection agent. The connection device may receive, from the one or more servers, a second public key associated with the one or more servers. Based on the second public key associated with the one or more servers, the client device may verify, the signed public key associated with the connection agent. The signed public key associated with the connection agent may include one or more of a machine ID or an expiration date.

One or more aspects of the disclosure may also provide one or more non-transitory computer readable media storing computer readable instructions that, when executed, cause a connection agent on a computing device to register, to one or more servers, the connection agent and a public key associated with the connection agent. Based on a determination that the connection agent is not tainted by one or more previously logged in users, the computer readable instructions may cause the connection agent to receive, from the one or more servers, the public key associated with the connection agent and signed by the one or more servers. The computer readable instructions may cause the connection agent to store the signed public key associated with the connection agent. The computer readable instructions may cause the connection agent to sign data received from a client device. The computer readable instructions may cause the connection agent to send, to the client device, the signed public key associated with the connection agent and the signed data. The computer readable instructions may cause the connection agent to remove, from the connection agent, a private key associated with the connection agent after the connection agent signs the data received from the client device. The computer readable instructions may cause the connection agent to remove, from the connection agent, the signed public key associated with the connection agent and the public key associated with the connection agent after the connection agent sends, to the client device, the signed public key associated with the connection agent. The computer readable instructions may cause the connection agent to receive, from the client device and based on a determination that a signature of the signed public key associated with the connection agent is verified, a request to connect to the connection agent and connect to the client device. The determination that the signature of the signed public key associated with the connection agent is verified may include a determination that a signature of the signed data is verified.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein relate to tracking connection agents on computing devices, such as without a trusted brokering authority. Connection agents may generate private keys and public keys, send or receive public keys, and/or sign data generated by client devices. One or more servers may generate private keys and public keys, determine whether connection agents are clean or tainted, send or receive public keys, and/or sign public keys. Client devices may receive public keys, send or receive data generated by client devices, and/or match private keys with public keys. In this way, client devices may determine whether connection agents are clean or tainted, even at an outage of one or more servers. As a result, individuals associated with the client devices may advantageously and securely utilize connection agents without using, for example, a trusted brokering authority.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
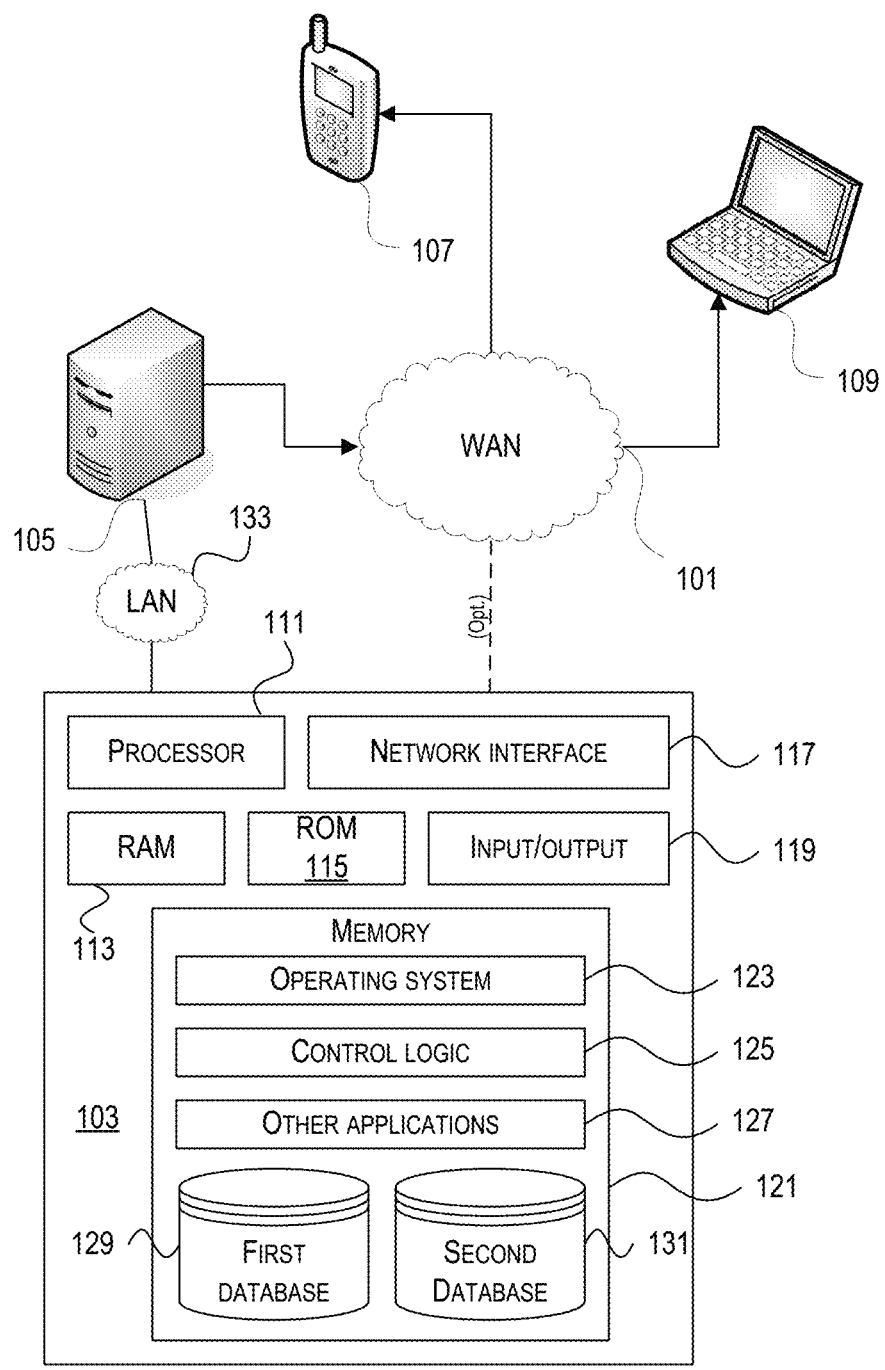
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
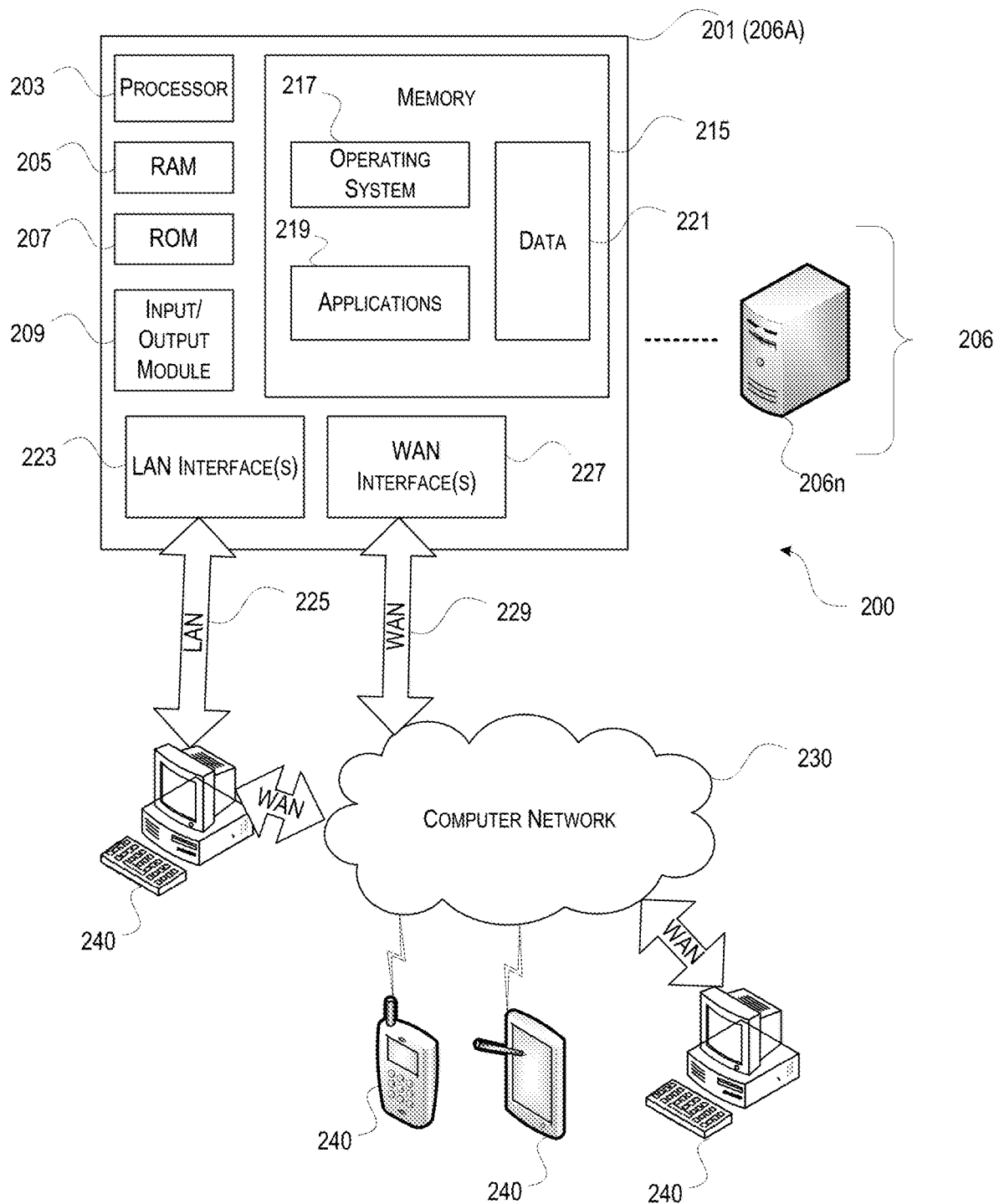
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206*b* (not shown). First server 206*a* may acquire an enumeration of applications available to the client machine 240 as well as address information associated with an application server 206 hosting an application identified within the enumeration of applications. First server 206*a* can then present a response to the client's request using a web interface, and communicate directly with the client 240 to provide the client 240 with access to an identified application. One or more clients 240 and/or one or more servers 206 may transmit data over network 230, e.g., network 101.

Figure 3:
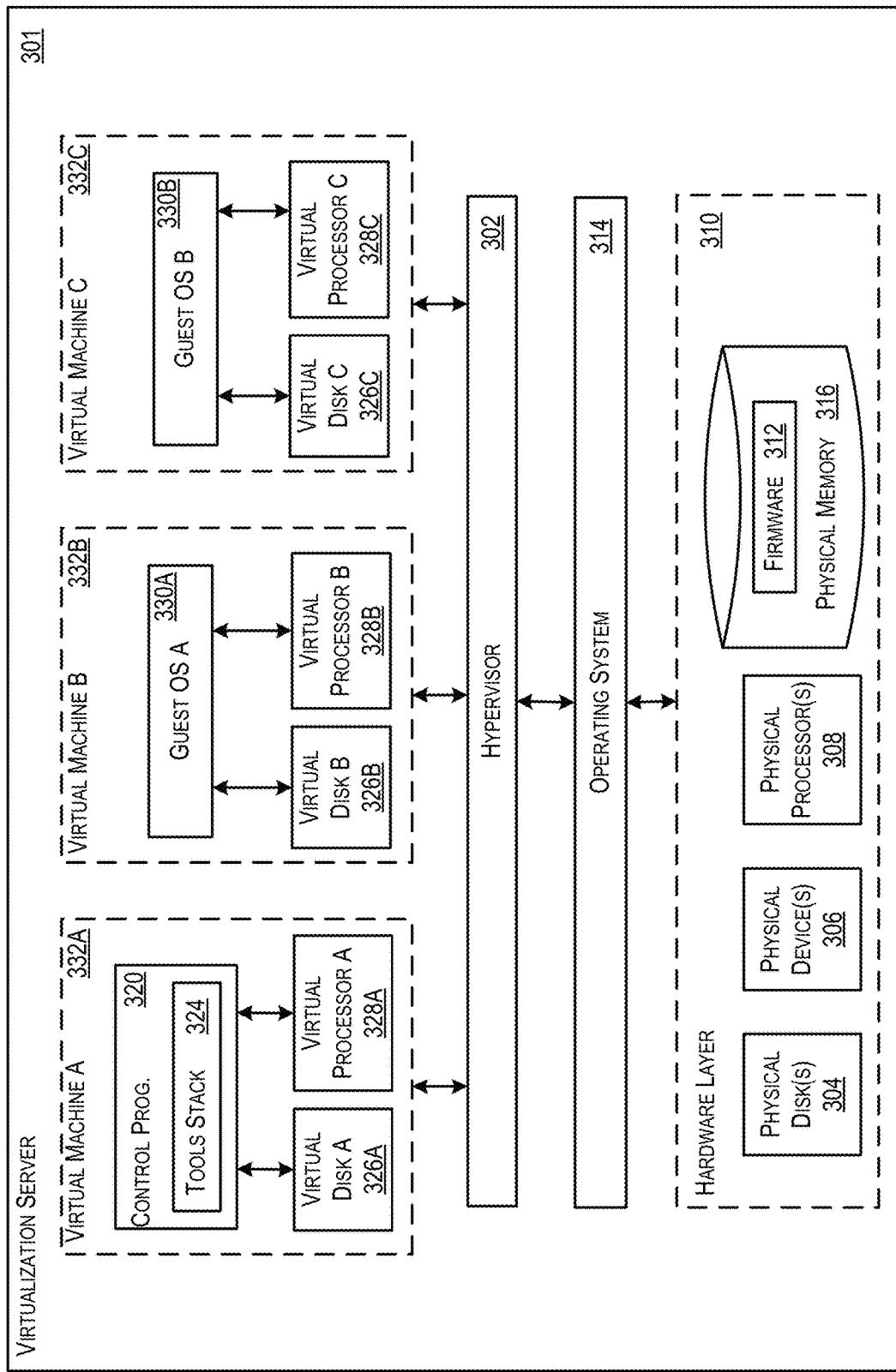
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e g, many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
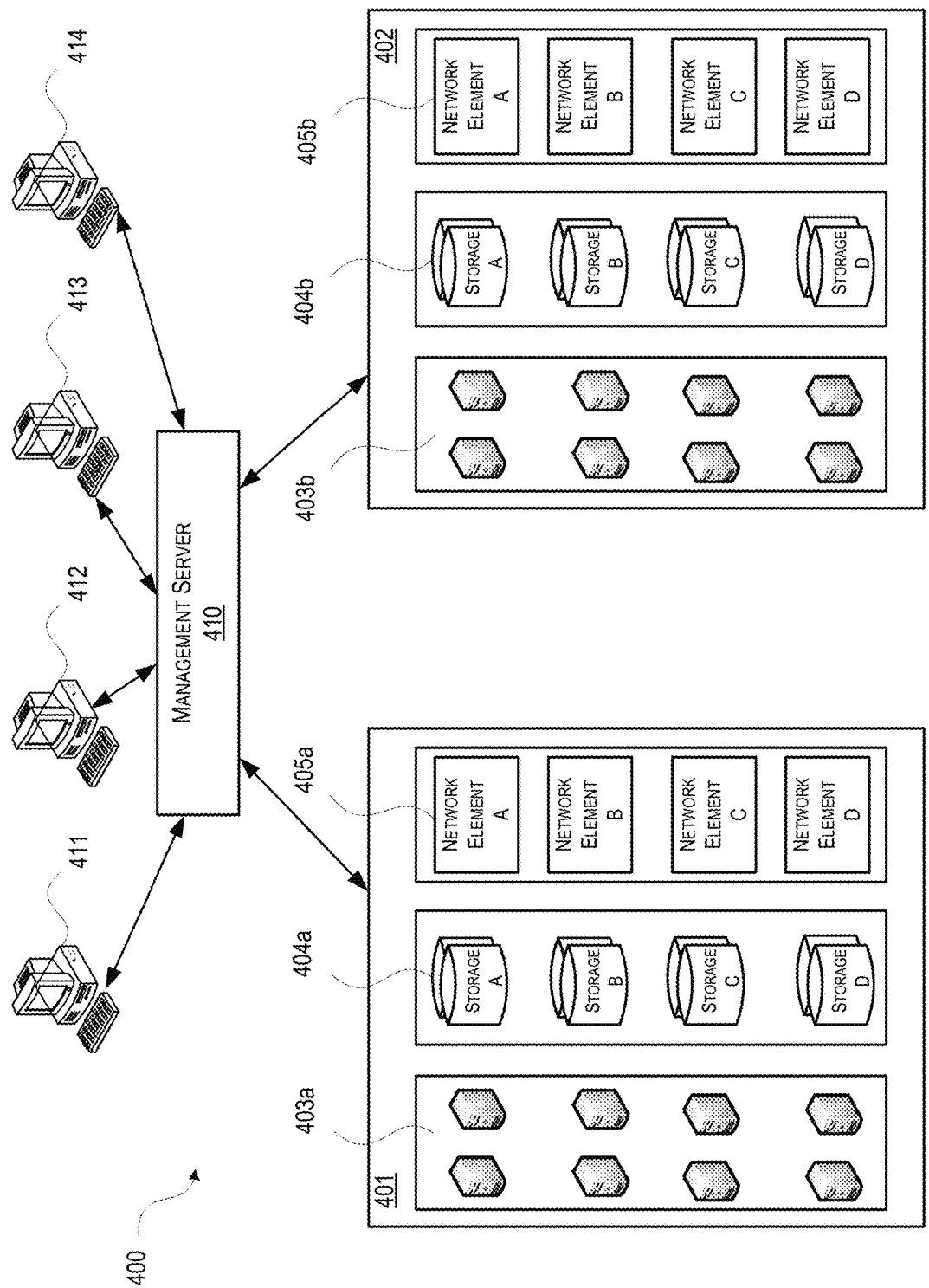
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Tracking Tainted Connection Agents

Figure 5:
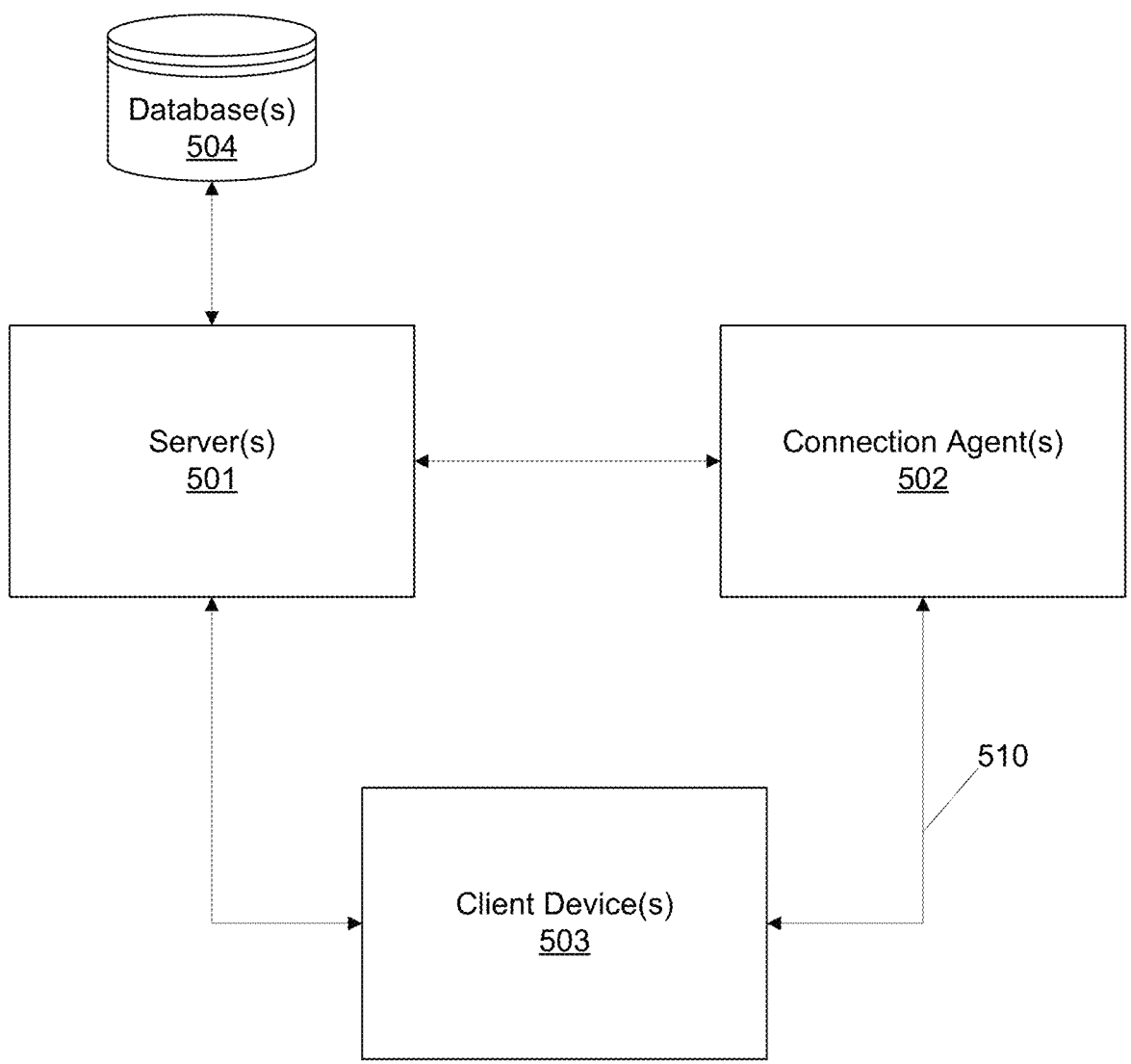
FIG. 5 depicts an illustrative operating environment that may be used in accordance with one or more illustrative aspects described herein.

FIG. 5 depicts an illustrative operating environment. An example operating environment may include one or more server(s) 501, one or more connection agent(s) 502, one or more client device(s) 503, one or more database(s) 504, and communication links 510. The server(s) 501 and/or the connection agent(s) 502 may comprise, for example, the data server 103 or the web server 105 of FIG. 1, the computing device 201 or the servers 206 of FIG. 2, the virtualization server 301, the virtual machines 332A-C of FIG. 3, and/or the virtualization servers 403 of FIG. 4. The client device(s) 503 may comprise, for example, the client computers 107 or 109 of FIG. 1, the client machines 240 of FIG. 2, and/or the client computers 411-414 of FIG. 4. The database(s) 504 may comprise, for example, the memory 121 or the databases 129 or 131 of FIG. 1, the memory 215 or the database 221 of FIG. 2, the physical disks 304, the physical memory 316 or the virtual disks 326 of FIG. 3, and/or the storage resources 404 of FIG. 4. The database 504 may comprise SQL (Structured Query Language) databases. SQL may be a domain-specific language used in programming and designed for managing data held in a relational database management system (RDBMS). The server(s) 501, the connection agent(s) 502, the client device(s) 503, and/or the database(s) 504 may be connected via one or more communication links 510. The communication links 510 may comprise or be a part of, for example, the networks 101 or 133, the networks 225 or 229 or the computer network 230 of FIG. 2, and/or the network resources 405 of FIG. 4.

The server 501 and the connection agent 502 may offer various services related to desktop and application virtualization for the client device 503. For example, the server 501, the connection agent 502, the client device 503, and the database 504 may allow online and offline access to virtual desktops and applications, provide a platform for building and delivering desktops and applications from a cloud, allow companies and organizations to synchronize and share files, offer mobile application and device management, allow universal access to virtual applications and desktops, provide application migration and management, and/or provide a cloud-based collaboration service. These functions may be non-limiting examples of desktop and application virtualization implementations.

In some embodiments, the server 501 may monitor and/or provision a group of virtual applications or virtual desktops (e.g., a virtual application or desktop pool) hosted on virtual machines, which may be configured with uniform settings and features. The server 501 may comprise, for example, a hypervisor, such as the hypervisor of FIG. 3. The hypervisor may be computer software, firmware and/or hardware that may create and/or run virtual machines. In some instances, when a client device 503 establishes a session with a server 501, the server 501, or its hypervisor, may assign the session to an available virtual desktop from an appropriate pool of virtual desktops. During an outage of the server 501, the server 501 might not be online. In that case, the server 501 might not be able to verify the connection agent 502 for the client device 503. Example methods of verifying the connection agent 502 will be discussed in further detail below.

In some embodiments, the server 501 may comprise a software-streaming technology that may deliver patches, updates, and/or other configuration information to multiple virtual desktop or application endpoints through a shared desktop image. The server 501 may comprise a delivery controller, which may comprise a server-side component responsible for managing user access and/or brokering and optimizing connections. The delivery controller may also provide machine creation services that create virtual applications and desktops and server images. The server 501 may direct the client device 503 to its assigned applications or desktops based on their user credentials. The server 501 may comprise a combination of remote application or desktop connections and virtualization. The server 501 may run multiple virtual machines, which operate the client OSs. The server 501 may also provide services related to cloud computing and networking.

In some embodiments, the connection agent 502 may enable connections to virtual applications and desktops (e.g., from a virtual application or desktop pool) for the client device 503. The connection agent 502 may be installed on machines that run applications or virtual desktops for the client device 503. The connection agent 502 may enable machines to register with the server 501. The connection agent 502 may manage connections to the client device 503. The connection agent 502 may be responsible for responding to requests from the server 501 or the client device 503. After the connection agent 502 is registered with the server 501, the connection agent 502 may start catering services to requests from the client device 503. The connection agent 502 may provide one or more virtual machines, which may be operating systems or application environments installed on software. The virtual machine may imitate dedicated hardware for the client device 503. Users of the client device 503 may have the same or similar experience on a virtual machine as they would have on dedicated hardware. The connection agent 502 may enable the client device 503 to connect to a virtual machine that may provide functionality of a physical computer, such as by using specialized hardware, software, or a combination thereof.

In some embodiments, the client device 503 may request, receive, and/or verify information from the server 501 and the connection agent 502 to securely connect to virtual machines, the connection agent 502, and/or the server 501. The client device 503 may request, from the server 501, information regarding available connection agents or virtual machines. The client device 503 may comprise application and/or desktop virtualization software that may deliver centrally-hosted applications to local devices without the necessity of installing them. The software may deliver individual applications, as opposed to entire desktops, to the client device 503. With that software, for example, WINDOWS applications may be used on the client device 503 that typically could not run them, including APPLE computers, mobile devices, and/or GOOGLE CHROMEBOOK. Conversely, the software may enable otherwise incompatible applications to run on WINDOWS desktops. The client device 503 may comprise a client agent that may be delivered from on-premises data centers or public, private, or hybrid clouds. Users of the client device 503 may access virtual applications and desktops via the client agent. The client device 503 may comprise a thin client or a lightweight computer, which may have been optimized for establishing a remote connection with a server-based computing environment.

In a cloud computing environment, users of the client device 503 may have a need for confidence that the connection agent 502 is clean, or not tainted. For example, the connection agent 502 may be tainted by malicious software, such as a debugger or keystroke logger, by previously logged in users. Malicious software installed on a virtual machine may compromise another users' credentials or data when they erroneously believe that the machine is clean and log on to the compromised machine. In these scenarios, the server 501 may track which machines are clean and which have been tainted. If the connection agent 502 is tainted, the server 501 may reimage the connection agent 502. As previously explained, the server 501 may comprise the management server 410 of FIG. 4, which may be configured to provision, create, and manage virtual machines and their operating environment. If the connection agent 502 is untainted, or freshly imaged, the server 501 may allow the client device 503 to access the connection agent 502. However, during a server outage, the client device 503 might not be able to verify a clean or tainted state of the connection agent 502 without a trusted brokering authority.

Examples described herein may use public-key cryptography or asymmetric cryptography, to determine whether the connection agent 502 is clean or tainted without a trusted central authority, such as the server 501. In a public key encryption system, any entity, such as the server 501 or the connection agent 502, may generate a pair of a public key and a private key associated with the entity. The entity may combine a message with the private key (e.g., paired with the corresponding public key) to create a digital signature on the message. That encrypted message may be decrypted with the corresponding public key. The encrypted message may be combined with the digital signature and the corresponding public key to verify that the signature is valid (e.g., the signature has been made by the owner of a corresponding private key). The private key may remain private (e.g., within the entity) and the public key may be openly distributed without compromising security. Changing the message or the signature may cause verification to fail. In a public key signature system, the authenticity of a message may be demonstrated by the signature, provided the owner of the private key keeps the private key secret (e.g., within the entity). For example, if the server 501 generates a pair of a private key and a public key associated with the server 501, the private key might not be sent to the connection agent 502 or the client device 503. Instead, the private key may be sent to and/or stored on the database 504, which may be securely protected. On the other hand, the public key associated with the server 501 may be sent to the connection agent 502 and/or the client device 503. The connection agent 502 and the client device 503 may similarly distribute their respective public key to other entities but keep their private key secured. Example methods of using keys to track tainted desktops and/or applications will be described in further detail in FIGS. 6A to 8B.

Figure 6A:
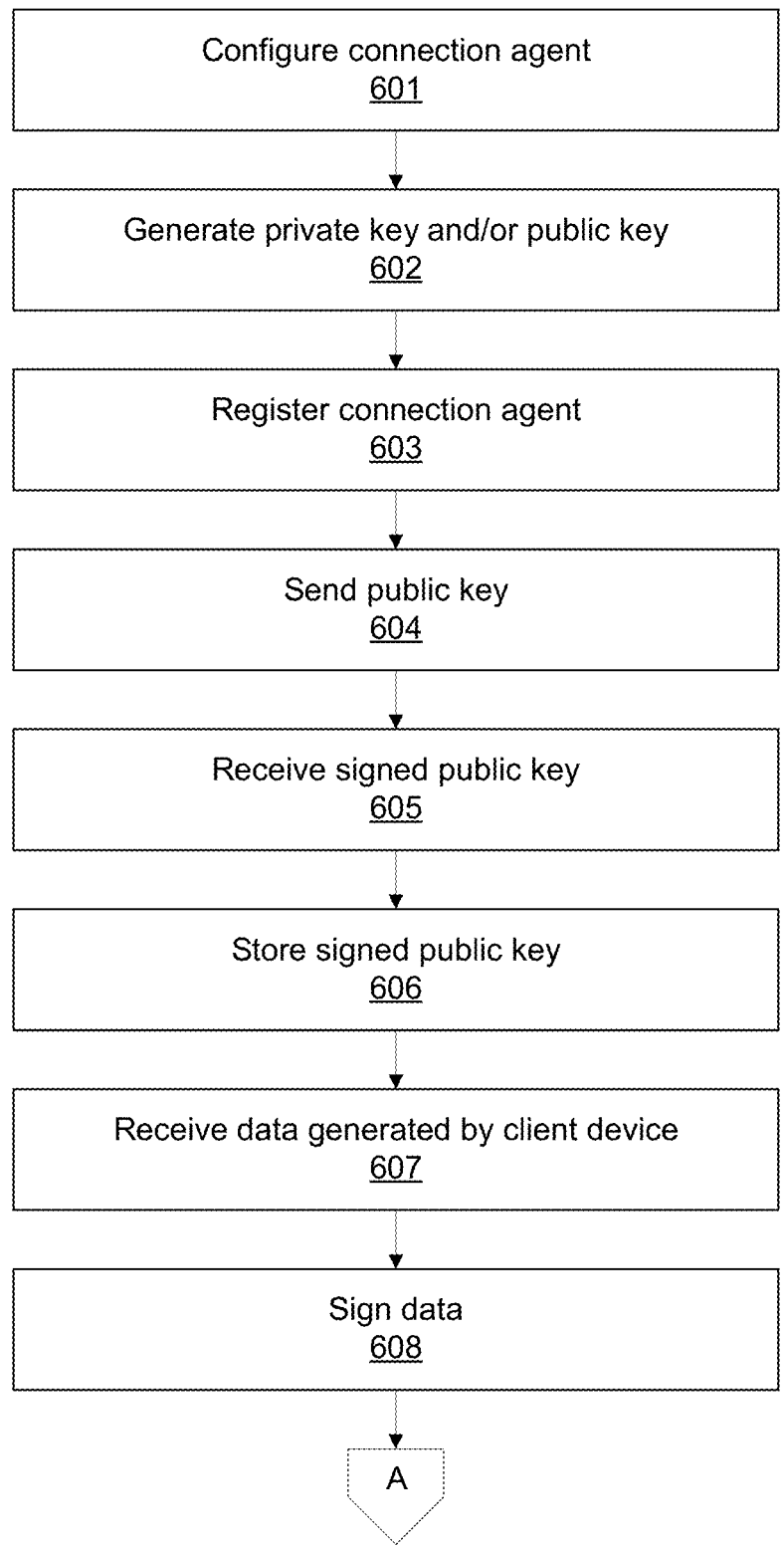
FIGS. 6A & 6B depict an illustrative flow chart of an example operation of one or more connection agents that may be used in accordance with one or more illustrative aspects described herein.
Figure 6B:
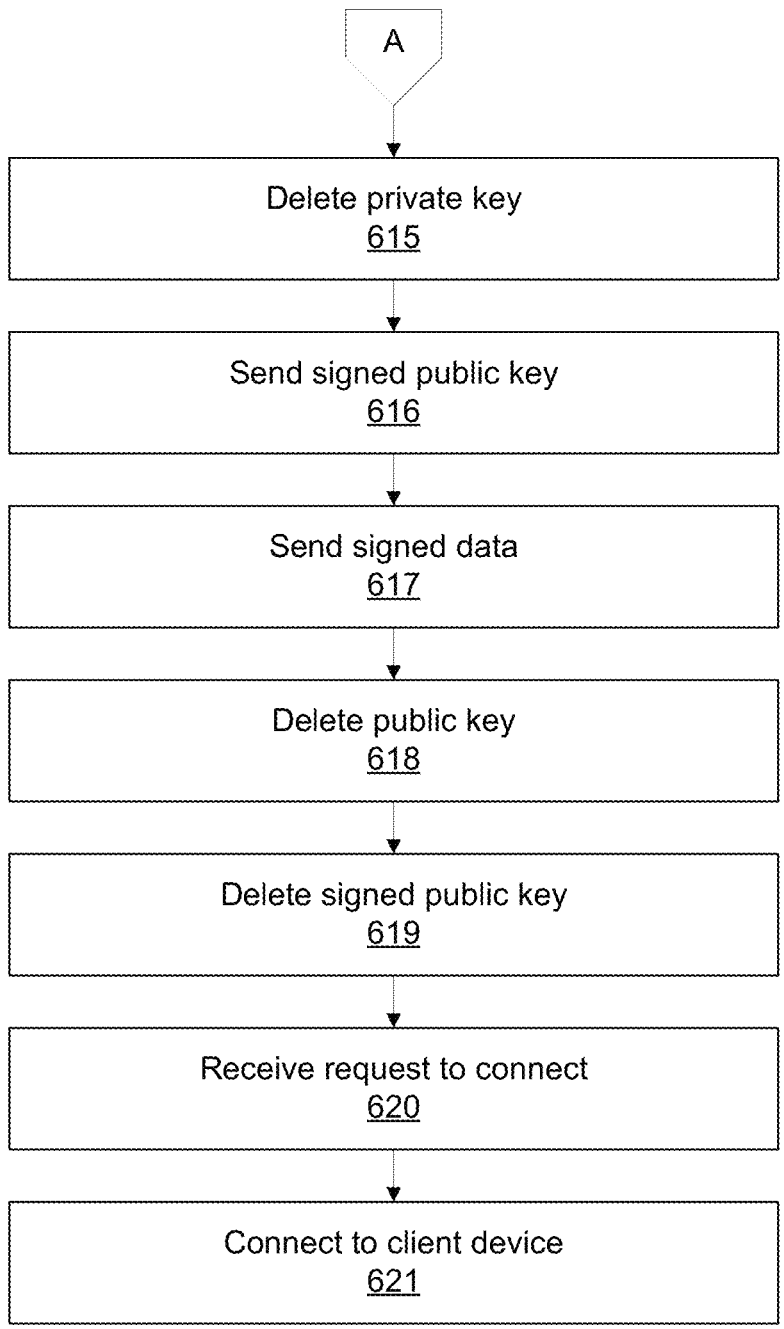

FIGS. 6A & 6B depict an illustrative flow chart of an example operation of one or more connection agents. In FIG. 6A, at step 601, a connection agent 502 may be configured. For example, the connection agent 502 may be booted or initiated. The connection agent 502 may be installed on the machine that runs applications or virtual desktops for the client device 503. The connection agent 502 may be installed by a connection agent installer downloaded from the server 501. At step 602, the connection agent 502 may generate a pair of a private key and a public key associated with the connection agent 502. The connection agent 502 may store the public key and the private key in memory. As previously explained, the memory may correspond to, for example, the memory 121 or the databases 129 or 131 of FIG. 1, the memory 215 or the database 221 of FIG. 2, the physical disks 304, the physical memory 316, or the virtual disks 326 of FIG. 3, and/or the storage resources 404 of FIG. 4. As will be described in further detail below, the connection agent 502 may openly distribute the public key to, for example, the server 501 and the client device 503. The private key, on the other hand, may be secured within the memory associated with the connection agent 502. The connection agent 502 may also sign data (e.g., a message) using the private key, as will be described in further detail below.

At step 603, the connection agent 502 may send a request for registration to the server 501. As will be described in further detail below, such as with reference to FIGS. 7A and 7B, the server 501 may confirm that the connection agent 502 is clean or untainted, and then may accept registration of the connection agent 502. At step 604, after registration, the connection agent 502 may send its public key to the server 501. The server 501 may receive the connection agent's 502 public key and may sign the public key if, for example, the connection agent 502 is untainted. The server 501 may sign the connection agent's 502 public key using a private key associated with the server 501. Examples of determining whether the connection agent 502 is tainted and signing the public key will be described in further detail below with reference to FIGS. 7A and 7B. At step 605, the connection agent 502 may receive the public key signed by the server 501 using the private key associated with the server 501. At step 606, the connection agent 502 may store the signed public key, for example, within a memory.

At step 607, the connection agent 502 may receive data generated by the client device 503. The data may comprise random data (e.g., a nonce) generated by the client device 503. For example, random numbers may be generated by secure random number generation algorithms such as pseudorandom number generators (PRNGs) that may automatically create long runs of numbers with random properties. The client device 503 may also request, from the connection agent 502, one or more credentials, which the client device 503 may use to determine whether the connection agent 502 is untainted. For example, the client device 503 may request machine ID(s) and/or expiration date(s) of virtual machines on the connection agent 502. The client device 503 may verify those machine ID(s) and/or expiration date(s) based on information provided by the server 501 during a connection lease. If the server 501 is offline, the client device 503 may still be able to verify whether the connection agent 502 is untainted or corrupted.

At step 608, the connection agent 502 may sign the data received from the client device 503. For example, the connection agent 502 may retrieve its private key from memory and/or sign the data using the connection agent's private key. After signing the data, the connection agent 502 may store the signed data within memory. In some embodiments, the connection agent 502 may store, within memory, its private and public keys, the signed public key, and/or the signed data.

In FIG. 6B, at step 615, the connection agent 502 may delete its private key, such as by erasing the private key from memory within the connection agent 502. By deleting the private key, the private key might not be reproduced by potential intruders, viruses, and/or hackers, which may be used to compromise the client-server architecture. For example, if a hacker possesses a private key of the connection agent 502, the hacker may use the private key to setup malicious software in virtual machines and/or compromise users' credentials.

At step 616, the connection agent 502 may send its signed public key to the client device 503. As previously explained, the server 501 may have signed the connection agent's 502 public key, and the signed public key may have been securely stored in memory (e.g., at step 606). The connection agent 502 may retrieve the signed public key from the memory and send the signed public key to the client device 503.

At step 617, the connection agent 502 may send the signed data to the client device 503. As previously explained, the connection agent 502 may have signed the data received from the client device 503 and securely stored the signed data in a memory (e.g., at step 608). The connection agent 502 may retrieve the signed data from the memory and send the signed data to the client device 503.

At steps 618 and 619, the connection agent 502 may delete its public key and the signed public key stored in a memory of the connection agent 502. By deleting the keys from memory, the connection agent 502 may prevent hackers and/or malicious software from reproducing its public key or a signature on the signed public key. The connection agent 502 may additionally protect the cloud computing system by removing any security information related to the public/private key pair associated with the connection agent 502. The security information may comprise machine ID(s) and/or expiration date(s) of virtual machines on the connection agent 502. Removing the security information may be performed after the signed public key and the signed data have been sent to the client device 503.

The client device 503 may complete verification of the connection agent 502, such as verifying a signature of the signed public key based on the public key associated with the server 501 and verifying a signature of the signed data. Examples of verifying the connection agent 502 will be discussed in further detail with reference to FIGS. 8A & 8B. After the connection agent 502 is verified, the client device 503 may attempt to connect to the connection agent 502. At step 620, the connection agent 502 may receive a request to connect from the client device 503. At step 621, the connection agent 502 may connect to the client device 503 to provide one or more virtual machines assigned to the client device 503. Users may install a client agent application or software at the client device 503. The client device 503 with the client agent software installed may be able to access virtual desktops and/or applications from a centralized host, such as the server 501 or the connection agent 502. Users may access remote desktops and/or applications from many different computer or mobile platforms.

Figure 7A:
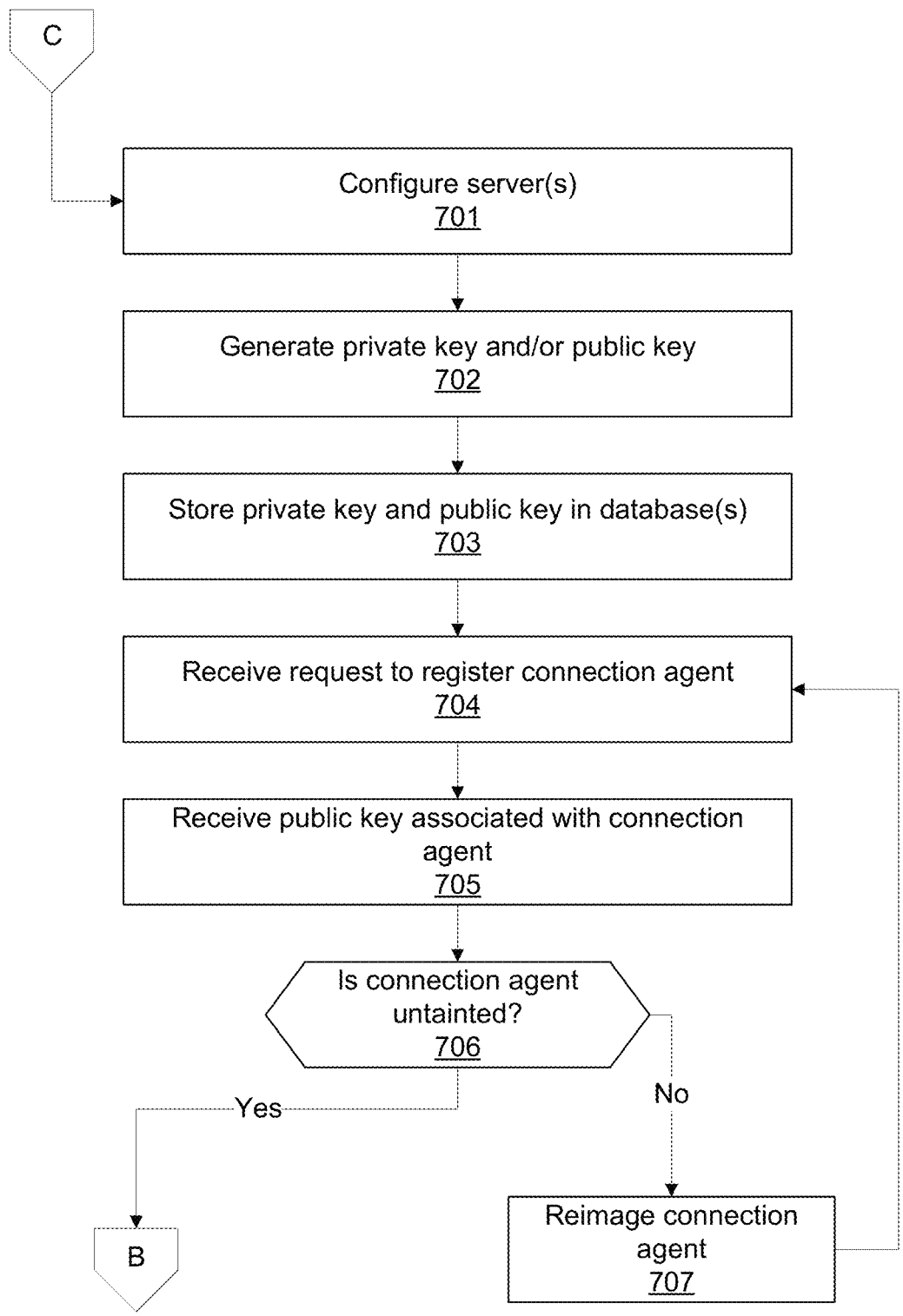
FIGS. 7A & 7B depict an illustrative flow chart of an example operation of one or more servers that may be used in accordance with one or more illustrative aspects described herein.
Figure 7B:
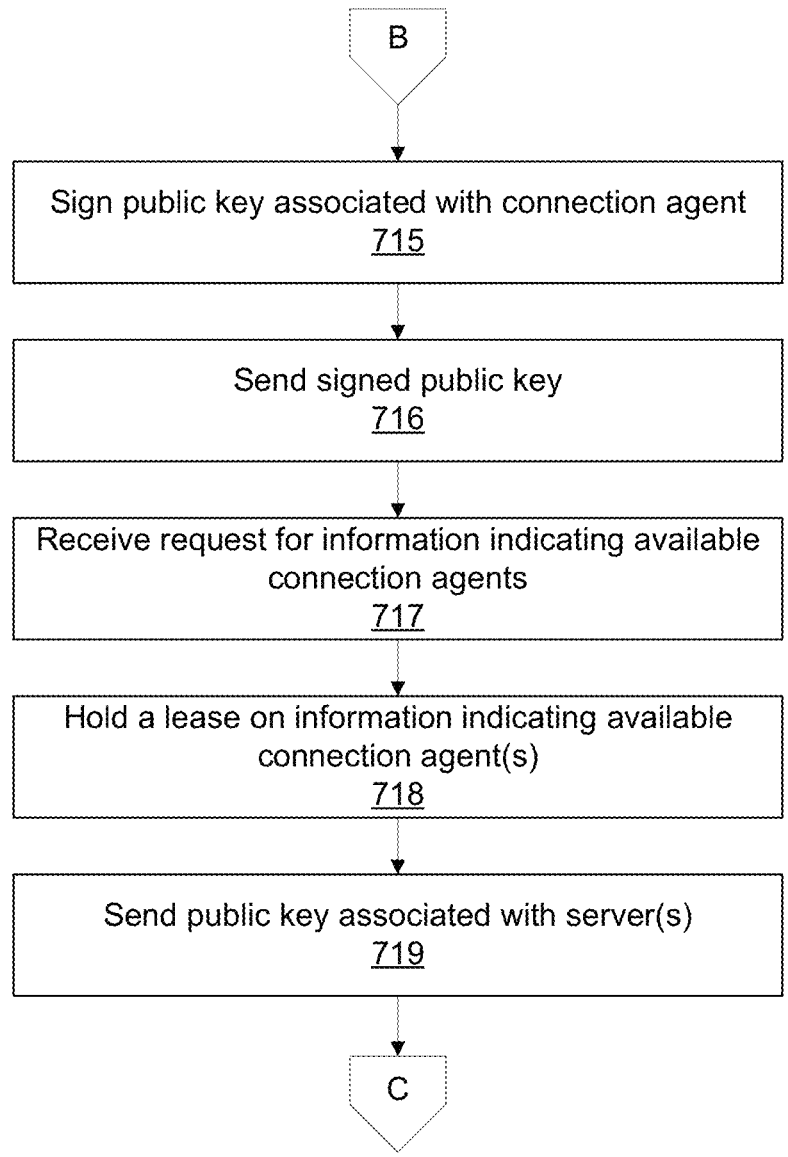

FIGS. 7A & 7B depict an illustrative flow chart of an example operation of one or more servers. FIGS. 7A & 7B may supplement methods and/or processes shown in FIGS. 6A & 6B (e.g., where an example operation of one or more connection agents was described). In FIG. 7A, at step 701, the server 501 may be configured. For example, the server 501 may be booted or initiated. At step 702, the server 501 may generate a pair of a private key and a public key associated with the server 501. At step 703, the server 501 may store the public key and/or the private key in the database 504, which may be memory external to or within the server 501.

One or more servers may share a pair of a public key and a private key via the database 504. For example, the one or more servers may be individually connected to the database 504. The database 504 may store a common public/private key pair for the one or more servers. Alternatively, the one or more servers may have individual databases 504. Each of the databases 504 may store an individual public/private key pair associated with each of the one or more servers. If there is a pool of public/private key pairs, the key pairs may be rotated at each verification. For example, the server 501 may use a first public/private key pair to verify that a first connection agent is untainted. The server 501 may use a second public/private key pair to verify that a second connection agent is untainted, and so on. After each verification, the used public/private key pair may be deleted for security. The database 504 may be securely protected from potential attacks from intruders, viruses, and/or hackers, via passwords, firewalls, certificates, etc.

At step 704, the server 501 may receive, from a connection agent 502, a request to register the connection agent 502. The connection agent 502 may send this request, such as step 603 of FIG. 6A. At step 705, the server 501 may also receive, from the connection agent 502, a public key associated with the connection agent 502. The server 501 may store the public key at the database 504.

At step 706, the server 501 may determine whether the connection agent 502 is untainted. For example, the server 501 may be configured to provision, create, and/or manage virtual machines on the connection agent 502 and its operating environment (e.g., hypervisors, storage resources, etc.). The server 501 may verify an untainted state of the connection agent 502. The server 501 may trigger a reset or reimaging of a disk associated with the connection agent 502. If no users have connected to the connection agent 502 after the last disk reimaging, the connection agent 502 is untainted. If any user has connected after the last disk reimaging, step 706 may be performed. The server 501 may enforce a policy that the server 501 may sign a public key once for each reimaging of the connection agent 502. The server 501 may ensure that the connection agent 502 is reimaged before the server 501 issues a new signature. Step 706 may be performed before or after the server 501 receives the public key associated with the connection agent 502 (e.g., at step 705). If the connection agent 502 is tainted (e.g., damaged, corrupted, plagued with spyware problems, etc.), the server 501 may proceed to step 707.

At step 707, the server 501 may reimage the connection agent 502. For example, the server 501 may remove and/or reinstall desktops, applications, and/or virtual machines associated with the connection agent 502. The server 501 may use a resource manager on the server 501 (e.g., the resource manager of the management server 410 shown in FIG. 4) to provision, create, and/or manage virtual machines on the connection agent 502. The server 501 may perform a block-level reset of a disk associated with the connection agent 502. The server 501 may also notify the client device 503 that the connection agent 502 is tainted. The server 501 may reassign the client device 503 to a different connection agent or virtual machine that has been verified and/or registered to the server 501. Alternatively, the server 501 may assign the client device 503 to the freshly imaged connection agent 502. The server 501 may return to, for example, step 704 to determine whether it has received another request to register a connection agent.

With reference to step 706, if the connection agent 502 is untainted (e.g., step 706: yes), the server 501 may proceed to step 715 shown in FIG. 7B. At step 715, the server 501 may sign the public key associated with the connection agent 502. For example, the server 501 may retrieve its private key and/or the public key associated with the connection agent 502, such as from the database 504. The server 501 may sign, using the server's private key, the connection agent's public key.

The server 501 may also add additional security mechanisms, such as machine ID(s) and/or expiration date(s) of one or more virtual machines associated with the connection agent 502, onto the signed public key. For example, the data being signed may include the machine ID(s) and/or expiration date(s). If a malicious user were to get access to a signature of the signed data, e.g., via intercepting network traffic before logon, or due to an error in which the signature is not completely deleted from memory, the machine ID(s) and/or expiration date(s) may minimize a potential damage. Also, the signature, along with the machine ID(s) and/or expiration date(s), may automatically expire after a few hours or days, rendering it worthless. Each of the machine ID(s) and/or expiration date(s) may be tied to one of the connection agents 502. The machine ID(s) and/or expiration date(s) may be sent to the client device 503, via a lease to the client device 503. Examples of the lease will be described in further detail below. At step 716, the server 501 may send the signed public key to the connection agent 502.

The server 501 may hold a lease on information related to available connection agents for the client device 503. For example, the client device 503 may receive a list of connection agents and the list may be valid for a predetermined lease period (e.g., two weeks). As client devices may connect and the server 501 reimages connection agents during the lease period, the list may contain a mix of both tainted and untainted connection agents. The lease may also contain one or more public keys belonging to the server 501. During a server or database outage, the client device 503 may use an unexpired list of connection agents, previously provided by the server 501. The list may be used by the client device 503 until the server 501 is recovered. By validating signatures described in further detail below, client device 503 can determine whether connection agents in the list are tainted or untainted.

At step 717, the server 501 may receive, from the client device 503, a request for information indicating available applications, desktops, virtual machines, and/or connection agents. The server 501 may regularly conduct verification of available connection agents and store a list of connection agents. At step 718, the server 501 may send, to the client device 503, information indicating available applications, desktops, virtual machines, and/or connection agents. For example, the server 501 may issue a lease on this availability information and may send the information to the client device 503 upon request or may send the information periodically. At step 719, the server 501 may send, to the client device 503, the one or more public keys belonging to the server 501. The server's public keys may be used to verify a signature of the public key associated with the connection agent 502 and signed by the server 501. The signed public key may be sent by the connection agent 502 to the client device 503. If the signature is verified, the client device 503 may determine that the connection agent 502 is untainted and/or the connection agent's public key is properly signed by the server 501. Examples of the client device 503 verifying that the connection agent 502 is not tainted will be discussed in more detail below with reference to FIGS. 8A & 8B.

During one or more of steps 717 to 719, the client device 503 may inquire, from the server 501, on availability of the connection agent 502. The client device 503 may receive, from the server 501, data indicating connection agent availability (e.g., in step 718) together with (or separately from) the public key associated with the server 501 (e.g., in step 719). Additional examples of the client device 503 using the server's public key will be described with reference to FIGS. 8A & 8B. One or more of steps 717 to 719 may occur before the server 501 receives, from the connection agent 502, a request for registration (e.g., in step 704). Also or alternatively, one or more of steps 717 to 719 may occur independently of steps 704 to 716.

Figure 8A:
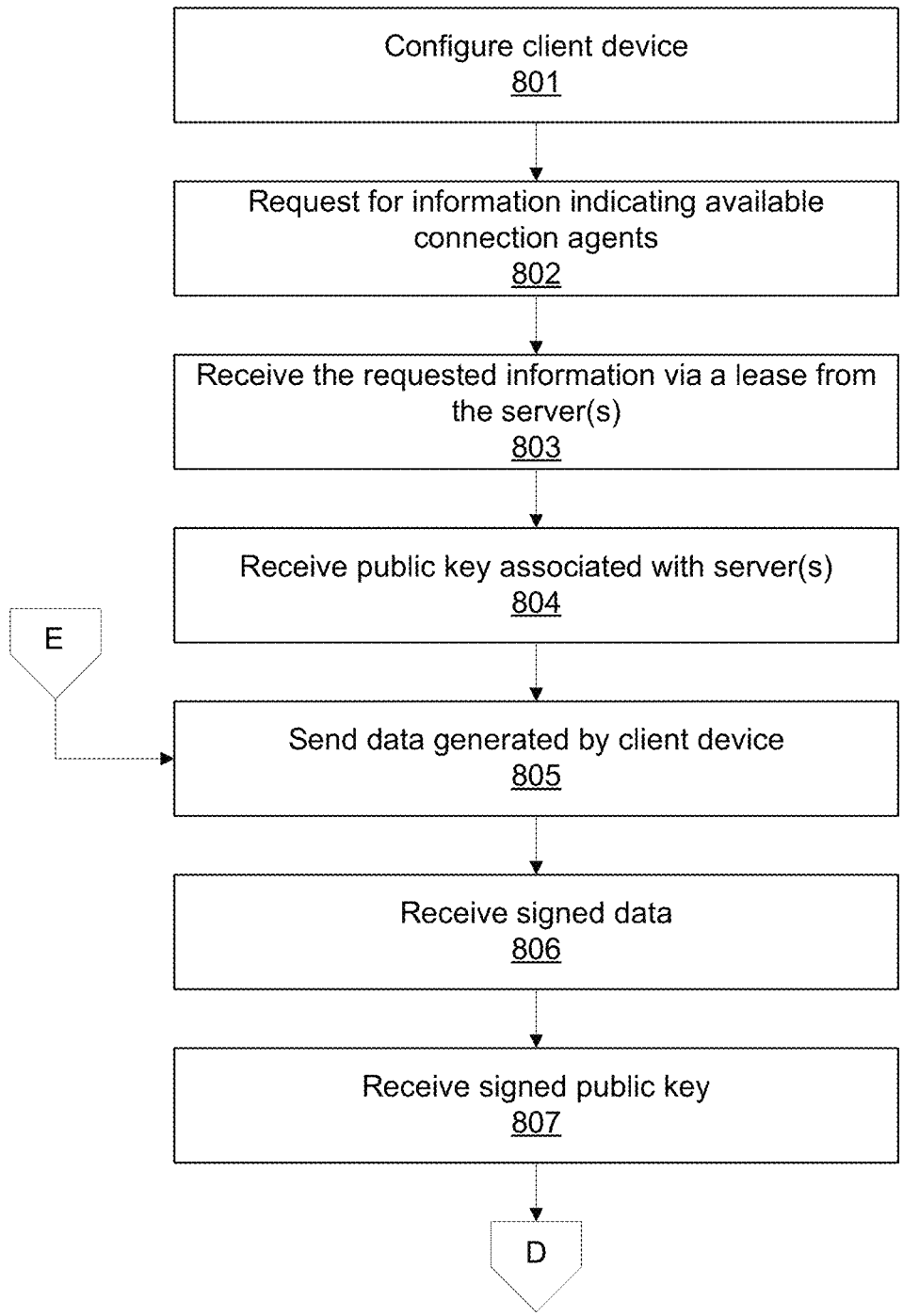
FIGS. 8A & 8B depict an illustrative flow chart of an example operation of one or more client devices that may be used in accordance with one or more illustrative aspects described herein.
Figure 8B:
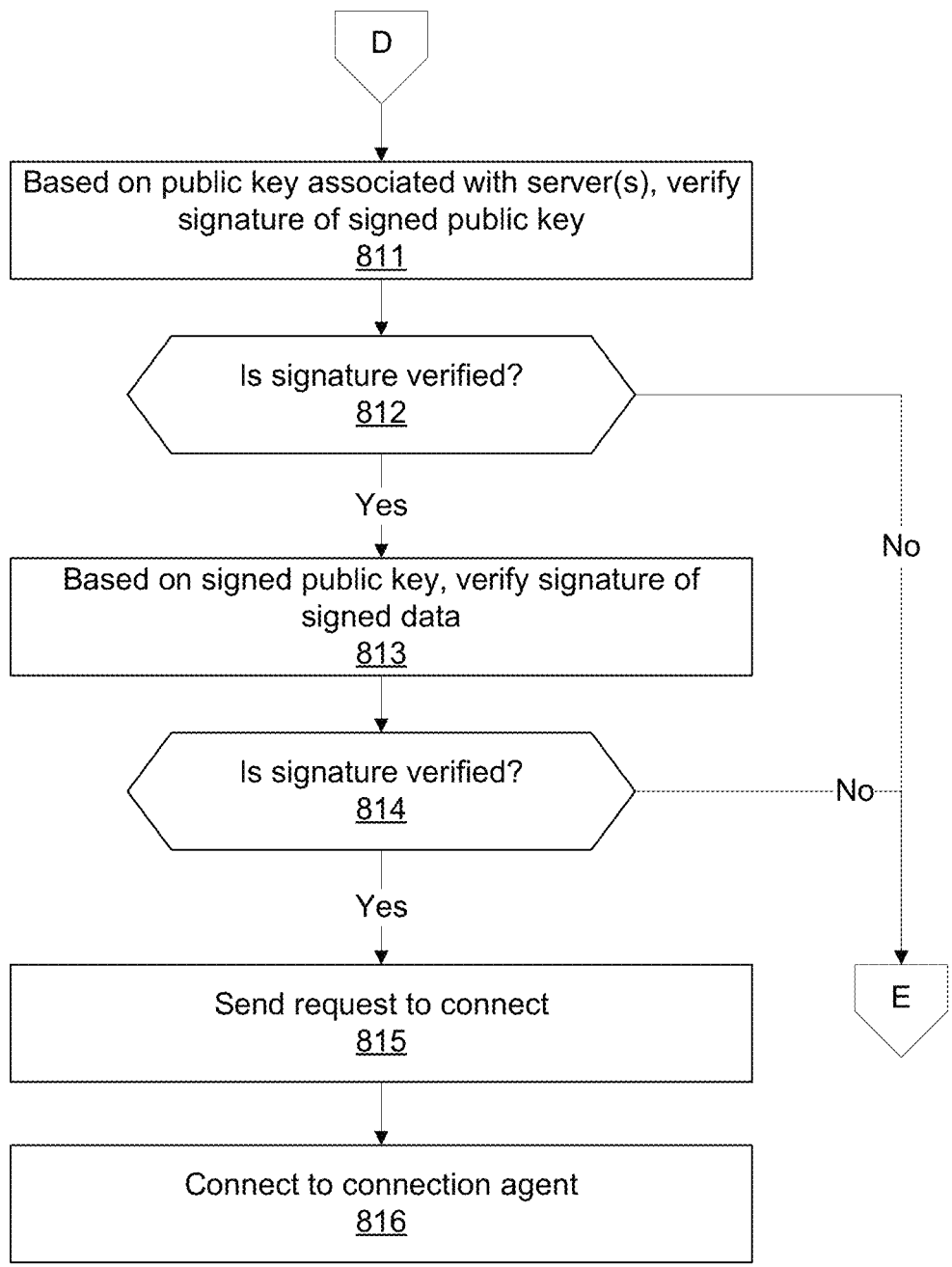

FIGS. 8A & 8B depict an illustrative flow chart of an example operation of one or more client devices. FIGS. 8A & 8B may supplement methods and/or processes shown in FIGS. 6A & 6B (e.g., where an example operation of one or more connection agents was described) and FIGS. 7A & 7B (e.g., where an example operation of one or more servers was described). At step 801, the client device 503 may be configured. The client device 503 may be booted or initiated. At step 802, the client device 503 may send, to the server 501, a request for information for available connection agents. As previously explained, the server 501 may receive the request at step 717 shown in FIG. 7B. The server 501 may send the requested information to the client device 503, such as at step 718 shown in FIG. 7B.

At step 803, the client device 503 may receive the requested information for available connection agents. As previously discussed, the server 501 may issue a lease on information for available connection agents to the client device 503, such as steps 717 to 719 of FIG. 7B. The information may indicate the availability of applications, desktops, virtual machines, and/or connection agents. At step 804, the client device 503 may receive, from the server 501, a public key associated with the server 501. As previously explained, this public key may be sent by the server 501, such as at step 719 shown in FIG. 7B. If the server 501 uses a plurality of public/private key pairs, the server 501 may send each of the plurality of public keys to the client device 503. The server 501 might not send its private key(s) to the client device 503. The client device 503 may use multiple public keys received from the server 501 to ensure that there is no downtime on verification of the connection agent 502.

The client device 503 may generate data to be sent to the connection agent 502. As previously explained, the data may comprise random data (e.g., nonce) generated by the client device 503. The data may comprise a random or pseudo-random number. At step 805, the client device 503 may send, to the connection agent 502, the data generated by the client device 503. The connection agent 502 may receive the data, such as at step 607 of FIG. 6A. As previously explained, the data may be signed by the connection agent 502, such as at step 608 of FIG. 6A.

At step 806, the client device 503 may receive, from the connection agent 502, the data signed by the connection agent 502. At step 807, the client device 503 may receive, from the connection agent 502, the public key associated with the connection agent 502 and signed by the server 501. As previously explained, the public key may have been signed by the server 501 at step 715 of FIG. 7B. The signed public key may be received and stored by the connection agent 502, such as at steps 605 and/or 606 of FIG. 6A. Through one or more of steps 801 to 807, the client device 503 may receive (1) the public key associated with the server 501 (e.g., in step 804), (2) the data signed by the connection agent 502 (e.g., in step 806), and/or (3) the public key associated with the connection agent 502 and signed by the server 501 (e.g., in step 807). The signed information in (3) may also indicate machine ID(s) and/or expiration date(s) of virtual machines associated with the connection agent 502. The client device 503 may use the machine ID(s) and/or expiration date(s) to verify that the connection agent 502 is recently verified by the server 501. The client device 503 may store one or more of received data in memory. The received data may be used to verify that the connection agent 502 is not tainted, as will be described in further detail below with reference to FIG. 8B.

In FIG. 8B, at step 811, the client device 503 may verify a digital signature of the public key associated with the connection agent 502 and signed by the server 501 (e.g., in step 715), based on the public key associated with the server 501. In public-key cryptography systems, a digital signature may be matched to a public key corresponding to a private key that generated the signature, such as to verify that the signature is valid. If matched, the signature may have been made by the owner of the private key.

The client device 503 may correlate a signature of the public key associated with the connection agent 502 and signed by the server 501 with the public key associated with the server 501. If the signature and the server's public key correspond, the client device 503 may determine that the connection agent 502 was verified by the server 501. As previously explained, if the server 501 determines that the connection agent 502 is untainted (e.g., in step 706 described above), the server 501 may sign the public key associated with the connection agent 502 (e.g., in step 715 described above). The server 501 may send the signed public key to the connection agent 502 (e.g., in step 716 described above). The connection agent 502 may store the signed public key (e.g., in step 606 described above). The connection agent 502 may also send the signed public key to the client device 503 (e.g., in step 616 described above). The client device 503 may receive the signed public key from the connection agent 502 (e.g., in step 807 described above).

Returning to FIG. 8B, at step 812, if the signature of the signed public key is not verified, the client device 503 may determine that the signature was not made by the server 501. The client device 503 may attempt to identify another connection agent. To search for a different connection agent, the client device 503 may reuse a list of available connection agents received from the server 501 (e.g., in step 803). Alternatively, the client device 503 may request an updated list from the server 501. The client device 503 may return to step 805 to attempt to verify another connection agent, e.g., by repeating one or more of steps 805 to 812.

Returning to FIG. 8B, if at step 812, the signature of the signed public key is verified (step 812: yes), the client device 503 may proceed to step 813. At step 813, the client device 503 may verify a signature of the data signed by the connection agent 502, based on the verified public key associated with the connection agent 502. Similar to step 811, the client device 503 may match a signature of the data signed by the connection agent 502 with the public key associated with the connection agent 502.

At step 814, if the signature of the data signed by the connection agent 502 is not verified, the client device 503 may determine that the connection agent 502 is tainted (or otherwise is not to be used) and/or may attempt to identify another connection agent. For example, the signature might not have been made by the connection agent 502. Also, an attacker may be attempting to replay the signature from an earlier connection associated with the connection agent 502. After the client device 503 identifies another connection agent, the client device 503 may return to step 805 to attempt to verify another connection agent, e.g., by repeating one or more of steps 805 to 814. If, at step 814, the signature of the data signed by the connection agent 502 is verified, the client device may proceed to step 815.

In some embodiments, the server 501 may include machine ID(s) and/or expiration date(s) of the connection agent 502 and/or virtual included machines in the signed public key at step 715 of FIG. 7B. The server 501 may send the signed public key comprising the machine ID(s) and/or expiration date(s) to the connection agent 502 (e.g., in step 716). The connection agent 502 may send the signed public key (e.g. in step 616) to the client device 503 (e.g. in step 807). The client device 503 may separately receive the machine ID(s) and/or expiration date(s) from the server 501, for example, via a lease (e.g., in step 718). The client device 503 may verify the machine ID(s) and/or expiration date(s) based on information received from the server 501. For example, as previously discussed, the signed information (e.g., the singed public key sent to the client device 503) may also indicate machine ID(s) and/or expiration date(s) of virtual machines associated with the connection agent 502. The client device 503 may use the machine ID(s) and/or expiration date(s) to verify that the connection agent 502 is recently verified by the server 501.

After the client device 503 verifies the connection agent 502, the client device 503 may attempt to connect to the connection agent 502 to access, for example, a virtual desktop or virtual application. At step 815, the client device 503 may send, via a client agent application, a connection request to the connection agent 502. At step 816, the client device 503 may connect with the connection agent 502.

In some embodiments, the server 501, the connection agent 502, and/or the client device 503 may use certificates, e.g., instead of public keys. For example, the server 501 and the connection agent 502 may generate their own key pairs. The server 501 may generate a certificate, either self-signed, or signed by another Certificate Authority (CA) based upon its public key. The connection agent 502 may generate a certificate associated with the public key associated with the connection agent 502 and may send a certificate signing request to the server 501. The server 501 may sign the certificate associated with the connection agent 502, such as after determining that the connection agent 502 is untainted. The server 501 may send the signed certificate to the connection agent 502. The connection agent 502 may send the signed certificate to the client device 503. The client device 503 may receive, from the connection agent 502, the certificate signed by the server 501. In some embodiments, the connection agent 502 may send an entire certificate chain, including the certificate belonging to connection agent 502, certificate belonging to server 501, and possibly one or more additional CAs.

The server 501 may generate a certificate associated with the server 501 and may send the certificate to the client device 503, such as via a lease. The server 501 may periodically send the certificate to the client device 503 and/or may send the certificate based on a request from the client device 503. The client device 503 may receive, from the server 501, the certificate associated with the server 501. In some embodiments, the server 501 may periodically send the certificate of another CA in the certificate chain which was used to sign the certificate belonging to server 501.

The client device 503 may generate random data and may send the data to the connection agent 502. The connection agent 502 may sign the data using its private key and may return the signed data to the client device 503. The client device 503 may receive the data signed by the connection agent 502.

The client device 503 may verify the certificate chain associated with the certificate belonging to connection agent 502, which may include the certificate associated with the server 501 and possibly certificates belonging to CAs in the certificate chain. If the certificate chain is verified, the client device may also verify a signature of the data signed by the connection agent 502, such as based on the verified certificate associated with the connection agent 502. If the signature and certificate chain are verified, the client device 503 may connect with the connection agent 502.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   registering, to one or more servers, a connection agent on a computing device and a public key associated with the connection agent;
   signing, by the one or more servers and based on a determination that the connection agent is not tainted by one or more previously logged in users, the public key associated with the connection agent;
   receiving, by the connection agent and from the one or more servers, the signed public key associated with the connection agent;
   storing, by the connection agent, the signed public key associated with the connection agent;
   signing, by the connection agent, data received from a client device; and
   sending, by the connection agent and to the client device, the signed public key associated with the connection agent and the signed data.

2. The method of claim 1, wherein the determination that the connection agent is not tainted by one or more previously logged in users comprises a determination that an unauthorized software application is not installed at the connection agent.

3. The method of claim 1, further comprising:
   before the registering the connection agent and the public key associated with the connection agent, reimaging, by the one or more servers and based on a determination that the connection agent is tainted, the connection agent.

4. The method of claim 1, further comprising:
   generating, by the one or more servers, a public key and a private key that are associated with the one or more servers; and
   storing, in a database associated with the one or more servers, the public key and the private key that are associated with the one or more servers.

5. The method of claim 1, further comprising:
   removing, from the connection agent, a private key associated with the connection agent after the signing the data received from the client device.

6. The method of claim 5, further comprising:
   removing, from the connection agent, the signed public key associated with the connection agent and the public key associated with the connection agent after the sending the signed public key associated with the connection agent.

7. The method of claim 1, further comprising:

after the sending the signed public key associated with the connection agent and the signed data, connecting the client device to one or more of a virtual desktop or virtual application associated with the connection agent.

8. One or more non-transitory computer readable media storing computer readable instructions that, when executed, cause a connection agent on a computing device to:

register, to one or more servers, the connection agent and a public key associated with the connection agent;

receive, from the one or more servers and based on a determination that the connection agent is not tainted by one or more previously logged in users, the public key associated with the connection agent and signed by the one or more servers;

store the signed public key associated with the connection agent;

sign data received from a client device; and send, to the client device, the signed public key associated with the connection agent and the signed data.

9. The one or more non-transitory computer readable media of claim 8, wherein the computer readable instructions, when executed, further cause the connection agent on the computing device to:

remove, from the connection agent, a private key associated with the connection agent after the connection agent signs the data received from the client device.

10. The one or more non-transitory computer readable media of claim 9, wherein the computer readable instructions, when executed, further cause the connection agent on the computing device to:

remove, from the connection agent, the signed public key associated with the connection agent and the public key associated with the connection agent after the connection agent sends, to the client device, the signed public key associated with the connection agent.

11. The one or more non-transitory computer readable media of claim 8, wherein the computer readable instructions, when executed, further cause the connection agent on the computing device to:

receive, from the client device and based on a determination that a signature of the signed public key associated with the connection agent is verified, a request to connect to the connection agent; and connect to the client device.

12. The one or more non-transitory computer readable media of claim 11, wherein the determination that the signature of the signed public key associated with the connection agent is verified comprises a determination that a signature of the signed data is verified.

* * * * *